United States Patent [15] 3,676,656
Schmidt [45] July 11, 1972

[54] ELECTRONIC DIGITAL SLIDE RULE

[72] Inventor: Herman Schmidt, Binghamton, N.Y.

[73] Assignee: General Electric Company, Schenectady, N.Y.

[22] Filed: June 30, 1969

[21] Appl. No.: 837,787

[52] U.S. Cl. ..........................235/156, 235/158, 235/150.3, 235/164

[51] Int. Cl. ....................G06f 7/385, G06f 7/39, G06f 15/34

[58] Field of Search .................235/156, 164, 150.3, 150.31, 235/158; 328/38; 340/336

[56] References Cited

UNITED STATES PATENTS

| | | | |
|---|---|---|---|
| 2,926,848 | 3/1960 | Gordon | 235/150.3 |
| 2,951,986 | 9/1960 | Gordon | 235/150.3 X |
| 3,043,516 | 7/1962 | Abbott et al. | 235/158 X |
| 3,264,457 | 8/1966 | Seegmiller et al. | 235/150.53 |
| 3,267,267 | 8/1966 | Clark | 235/164 |
| 3,414,720 | 12/1968 | Battarel | 235/164 |
| 3,396,378 | 8/1968 | Keith | 340/336 X |
| 3,400,388 | 9/1968 | Blank | 340/336 X |
| 3,564,535 | 2/1971 | Ward et al. | 235/197 X |

*Primary Examiner*—Malcolm A. Morrison
*Assistant Examiner*—James F. Gottman
*Attorney*—Oscar B. Waddell, Francis K. Richwine, Frank L. Neuhauser, Joseph Forman and Irving M. Freedman

[57] ABSTRACT

An electronic digital slide rule in the form of a small hand-carried, battery powered digital electronic calculator capable of performing substantially all of the mathematical operations performed by the conventional mechanical slide rule. The electronic digital slide rule utilizes a computing technique based on integrating for a period of time porportional to one input variable $x$, a fixed or variable pulse rate signal, the magnitude of which may be proportional to another input variable $y$, to a constant, or to some other known function. The computing technique is implemented by a pulse rate generator producing a pulsetrain representative of one factor of a function whose solution is desired. First factor input means are provided for supplying the one factor to the input of the pulse rate generation means whose output is supplied to an output integrator and timing circuit. A second factor input means is coupled to and controls at least in part operation of the output integrator and timing circuit means. The electronic digital slide rule is completed by a function selector switching means that interconnects the pulse rate generation means to the second factor input means and to the output integrator and timing circuit means in a manner to perform a selected one of a plurality of different logical operations on the first and second input factors to thereby derive a desired output solution. In preferred embodiments of the slide rule, an output indicating means is coupled to the output from the output integrator and timing circuit means for displaying the solution in legible form. The plurality of different logical operations capable of being performed by the electronic digital slide rule include the arithmetic operations of addition, subtraction, multiplication, division, squaring and square rooting, and exponential, logarithmic and trigonometric operations. In constructing the electronic digital slide rule, the first and second factor input means may comprise mechanical switches having a plurality of discrete contact positions which also serve as in input memory for retaining the value of the input first and/or second factors. It is also preferred that the electronic digital slide rule operate from a battery operated power supply means for supplying energizing power to the slide rule through a start-stop switch which energizes the slide rule only during periods of use and conserves the battery power supply during periods of non-use. It is also anticipated that the electronic digital slide rule would be fabricated from micro-miniaturized integrated circuit structures mounted on a single supporting circuit board and housed in the form of a pocket size container for easy transport and use. A preferred embodiment of the electronic digital slide rule also includes a decimal point placement indicating means for visibly indicating to the user of the device the position of the decimal point in an output solution displayed by the output indicating means.

18 Claims, 17 Drawing Figures

PRESET COUNTERS TO:

| COUNTER | SINE | COSINE |
|---|---|---|
| Q | 0000 | 0000 |
| Y | 9999 | 9999 |
| Z | 0000 | 9999 |

ELECTRONIC DIGITAL SLIDE RULE

BACKGROUND OF INVENTION

1. Field of Invention

This invention relates to a novel electronic digital slide rule. More particularly, the invention relates to an electronic digital calculator or computing system which includes input and output devices, is fabricated from micro-miniaturized circuit structures, is completely battery operated, is small enough to be hand-carried or carried in a coat pocket, and is capable of performing substantially all of the operations of which a classic engineering mechanical slide rule is capable, such as multiplication, division, subtraction, addition, exponential logarithmic and trigonometric functions.

2. Background Prior Art

Substantially all engineers and scientists at one time or another in their career have utilized the classical slipstick type of slide rule in the practice of their profession, and generally consider it as one of the most valued possessions for easing the burden of the innumerable calculations required to be performed in engineering and scientific studies. Even with the advent of the electronic computer, this valuable hand tool continues to be desk drawer equipment for assisting in the immediate solution of many types of mathematical problems. As is well known, however, the mechanical slide rule, in the sizes commonly used, is reasonably accurate to only the three most significant digits, and then only if the user is careful in aligning and reading out the slide wire and the value indicia markings. As a consequence, only the roughest solutions can be obtained under normal operating conditions with a mechanical slide rule.

The present invention was devised as a complete, electronic digital computing system that can perform most basic arithmetic operations directly (not by repeated addition) normally performed with a slide rule and without requiring the need for an extensive memory. Accordingly, the invention makes available a digital electronic counterpart of the mechanical slide rule having all of its versatility, but avoiding many of its limitations. Because of its electronic digital nature, the invention obtains improved accuracy to within one least significant digit, and has no basic accuracy limitation except those impressed by size and cost considerations. Further, considerably less care and expertise is required in the operation of the electronic digital slide rule. It is fast responding, relatively low cost, and portable in that it can be operated from a battery power supply. Because of these characteristics, the invention satisfies the need for a portable and yet accurate tool for fulfilling a variety of immediate problem-solving needs previously solved by use of a mechanical slide rule, and does so much more effectively.

SUMMARY OF INVENTION

It is therefore a primary object of the invention to provide an electronic digital slide rule capable of performing a wide variety of mathematical operations such as addition, subtraction, multiplication, division, squaring, square root as well as deriving solutions to exponential, logarithmic, and trigonometric functions, etc.

Another object of the invention is to provide such an electronic digital slide rule which can be hand-carried or used as a desk drawer aid to the ready, quick and accurate solution of a wide variety of problems of the above type that otherwise would not require or economically justify the use of more sophisticated computer system time.

A still further object of the invention is to provide an electronic digital slide rule having the above set forth characteristics which further includes the capability of indicating to the user of the slide rule the proper placement of the decimal point in the solution to calculations performed by the electronic digital slide rule.

In practicing the invention, an electronic digital slide rule is provided which comprises a pulse rate generation means for producing a pulsetrain representative of one factor of a function whose solution is desired together with first factor input means for supplying the one factor to said pulse rate generation means. The slide rule further includes output integrator and timing circuit means and second factor input means coupled to and controlling at least in part operation of the output integrator and timing circuit means. A function selector switching means interconnects the pulse rate generation means to the second factor input means and to the output integrator and timing circuit means in a manner to perform a selected one of a plurality of different logical operations on the first and second input factors to thereby derive a desired output solution. The slide rule further preferably includes output indicating means coupled to the output from the output integrator and timing circuit means for deriving a readily perceivable indication of the output solution. The electronic digital slide rule thus comprised is capable of performing a plurality of different logical operations including the arithmetic operations of addition, subtraction, multiplication, division, squaring and square rooting, and exponential, logarithmic and trignometric operations.

In preferred forms of the electronic digital slide rule, the first and second factor input means comprise mechanical switches having a plurality of discrete contact positions which also serve as an input memory for retaining the value of the input first and second factors. The electronic digital slide rule preferably includes a battery operated power supply and a start-stop switch interconnected between the battery power supply and the circuit structure of the slide rule for energizing the slide rule only during periods of use and conserving the battery power during periods of non-use. The function selector switching means preferably comprises a third mechanical switch for interconnecting the elements of the electronic digital slide rule in different circuit configurations determined by the particular logical operations to be performed. Preferably all of the circuit structures of the slide rule are fabricated from micro-miniaturized integrated circuit components mounted on a single supporting circuit board and housed in the form of a pocket size container for easy transport and use. Additionally, decimal point indicating means are coupled to and controlled by the first and second factor input means for indicating the placement of the decimal point in the output solution obtained with the electronic digital slide rule.

The electronic digital slide rule having the above set forth characteristics comprises a complete digital computing system that can perform most basic arithmetic operations directly (not by repeated addition), and without the need for a conventional memory. The basic computing technique of the electronic digital slide rule is an extension and refinement of the technique constituting the subject matter of U.S. Pat. No. 2,926,848 issued Mar. 1, 1960 to B. M. Gordon. It is based on integrating for a period of time proportional to one input variable $x$, a fixed or variable rate signal, the magnitude of which may be proportional to another variable $y$, a constant, or some other known function.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several Figures are identified by the same reference character, and wherein.

DETAILED DESCRIPTION OF PREFERRED EMBODIMENTS

Figure 1:
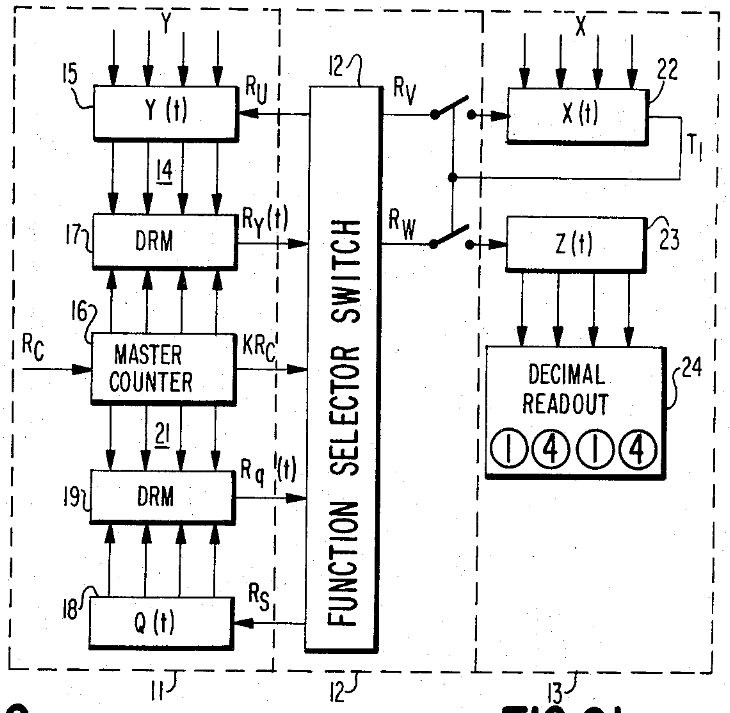
FIG. 1 is a functional block diagram of the construction of a preferred form of electronic digital slide rule in accordance with the invention.

The electronic digital slide rule (EDSR) is comprised of three basic parts formed by a pulse rate generator circuitry shown in the dotted outline box 11 of FIG. 1, a function selector switch 12 and an output integrator and timing circuitry shown at 13. The pulse rate generator 11 may comprise a single decimal rate multiplier 14 that is comprised of a first input counter 15 in which the value of one of the factors may be registered, a master counter 16 having a reference rate pulsetrain $R_C$ supplied thereto from a suitable clockpulse source, and a plurality of decimal rate multiplier gates shown at 17 which are interconnected together in the form of a well known multiplier counter arrangement for producing an output pulsetrain $R_Y(t)$ having a pulse rate proportional to the product of the input factor $Y(t)$ multiplied by the reference pulse rate $R_C$. The decimal rate multiplier thus comprised is similar to the well known binary rate multiplier such as that described in U.S. Pat. No. 3,435,196 issued Mar. 25, 1969, to H. Schmid, entitled "Pulse-Width Function Generator" and assigned to the General Electric Company. The main distinction between the binary rate multiplier and the decimal rate multiplier operate in binary-coded-decimal form in contrast to the binary rate multiplier counters which operate in pure binary form. For those arithmetic operations where the pulse rate of the output pulsetrain supplied from the decimal rate multiplier (hereinafter referred to as the DRM) must be proportional to an input variable $y$, the binary-coded-decimal (hereinafter referred to as BCD) number representing $y$ is preset into the first input or Y counter 15 at time $t_0$ which occurs at the beginning of each computation. At the same time $t_0$, the master counter 16 is reset to 0, and is supplied with a known constant frequency reference repetition rate pulsetrain $R_C$ from a local clockpulse generator (not shown in FIG. 1). As a consequence, the output obtained from the multiplier gates 17 of DRM 14 will be a pulsetrain having a pulse repetition rate $R_Y = y \cdot R_C$.

For trigonometric functions such as cos $x$ and sine $x$, it is necessary to provide an additional input counter 18 together with its associated decimal rate multiplier gates 19 interconnected with master counter 16 to form a second decimal rate multiplier 21. As will be explained more fully hereinafter in connection with FIG. 2, for such transcendental functions, the Y counter 15 is either reset to zero or preset to some fixed constant value with either $R_C$, $R_Y$ or $R_Q$ (where $R_Q$ is the output pulsetrain from the second DRM 21) being connected back to the input of the input counter 15 so as to produce at the output of the DRM 14 an output pulsetrain $R_Y$ where:

$$R_Y = \int R_U dt \text{ and } R_U \text{ is}$$

either $R_C$, $R_Y$ or $R_S$ depending upon the operation desired to be performed and the setting of the function selector switch 12 as described hereinafter.

The computing technique employed in the electronic digital slide rule shown in FIG. 1 is based on integrating for a period of time proportional to one input variable $x$, a fixed or variable pulse rate signal (such as $R_Y$), the magnitude of which maybe proportional to another input variable Y, a constant, or to some other known function. In its most general form, the output obtained from such a computing circuit is given by the expression:

$$Z = K \int_0^{T_i} R(t)dt \tag{1}$$

where $$T_i = f(x) \text{ and } R(t) = f(y)$$

With this arrangement, $R(t)$ is a pulse rate signal in which the pulse repetition rate or density is proportional either to the input variable $Y$, a constant or to some function of time, and the integration period or interval $T_i$ is a function of some other input variable $x$.

From the above brief description, it will be appreciated that the X counter 22 in the output integrator and timing circuitry 13 produces the integration time interval $T_i$ which is directly proportional to the input variable $x$ and inversely proportional to an input pulse rate $R_V$ which may be equal to $R_C$ or $R_Y$ depending upon the setting of the function selector switch 12 as described hereinafter. For all direct functions (multiplication, squaring, exponential, etc.,) a BCD number proportional to X is set into the X counter 22 at the beginning ($t_0$) of the computation period. Thereafter the contents of the X counter 22 is decreased to zero by integrating an input pulsetrain $R_V$. Simultaneously $R_W$ is integrated for the period $T_i$ into an output counter 23 where $R_W$ is either $R_C$, $R_Q$ or $R_Y$ depending upon the particular operation being performed (and hence the setting of the function selector switch 12). The number or resultant count stored in the Z counter 23 at the end of the integration period $T_i$ therefore, is the output variable Z, and its value may be read out in a digital display 24 coupled to the Z counter output terminal for displaying the output as an ordinary decimal number.

As stated above, the X counter 22 produces the integration time interval $T_i$, and for all direct functions such as multiplication, squaring, etc., a BCD number proportional to X is set into the X counter. Thereafter the contents of the counter is decreased to zero by integrating the reference rate pulsetrain $R_C$. The time required for this process is the desired integration time interval $T_i$ since:

$$x = \int_0^{T_i} R_c dt = R_c T_i \text{ or } T_i = \frac{x}{R_c} \tag{2}$$

For inverse functions such as division, square root, logarithmic, etc., the X counter 22 serves to integrate the pulse rate $R_Y$, which may be either a constant or a function of time, as follows:

$$x = \int_0^{T_i} R_y dt$$

$$\text{If } R_y \text{ is some function } f(y) \text{ then } T_i = \frac{x}{f(y)} \tag{3}$$

The electronic digital slide rule can be made to perform almost any arithmetic operation, however, certain functions can be more readily solved with greater accuracy than others. The mathematical operations of addition, subtraction, multiplication, division, squaring and square root are relatively straight forward, and can be performed with precision. Exponentials and natural logarithms are somewhat more involved, and the results obtained are not quite as accurate due to the fact that the integrating counters employed to implement the EDSR do not have infinite resolution. The advantage, however, is that these functions are performed with the same circuitry used to perform the simple functions. The trigonometric sine and cosine function likewise can be solved by the basic technique described, but require the addition of one more decimal rate multiplier 21, and similarly suffers from decreased accuracy due to the limited resolution of the counters employed.

Figures 2A, 2B, 2C, 2D:
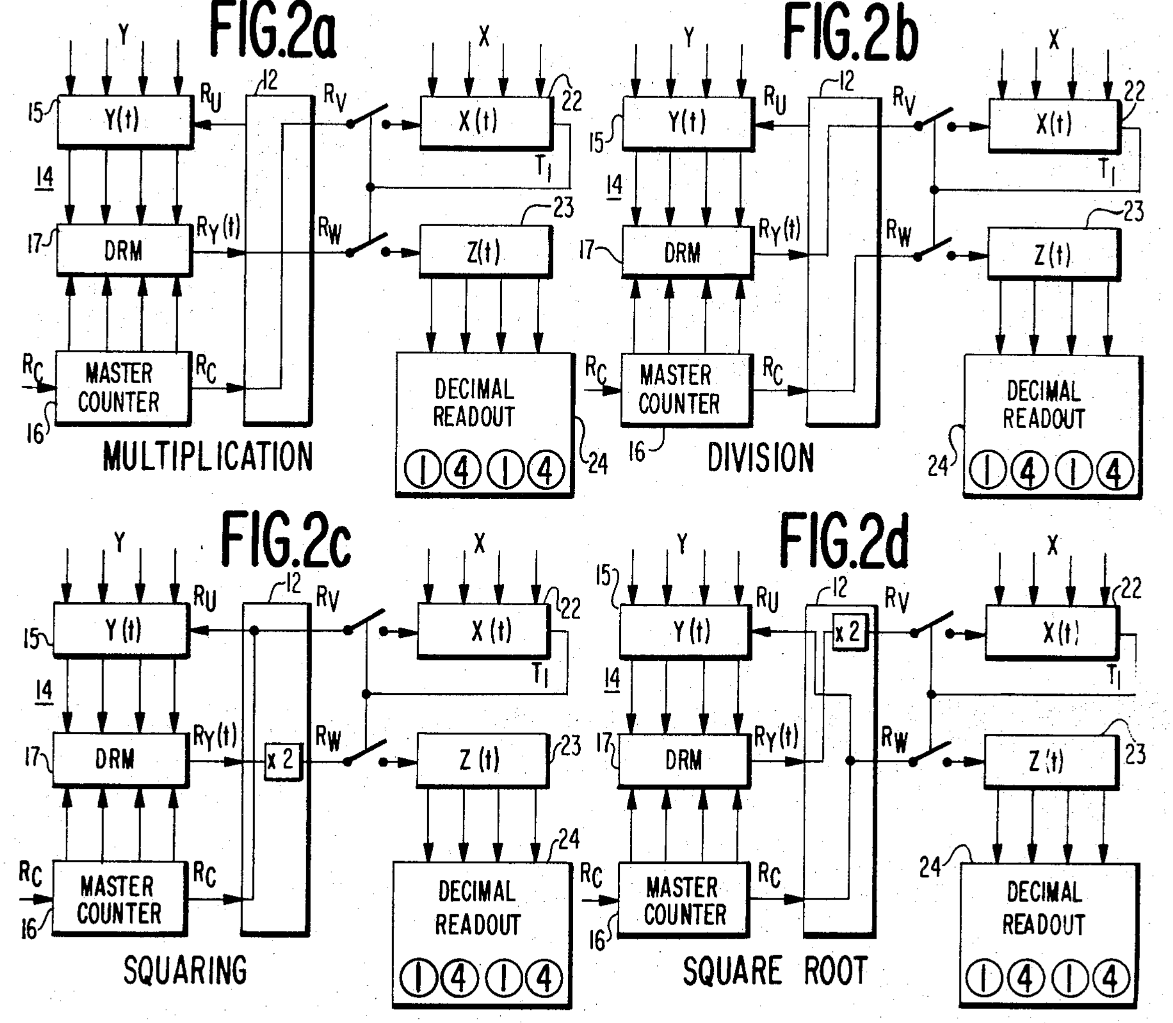
FIG. 2*a*–2*i* illustrate the various interconnections of the circuit components of the electronic digital slide rule shown in FIG. 1, required to perform the several different mathematical operations of multiplication, division, squaring, square root, addition-subtraction, exponential, logarithmic, sine and cosine functions.

FIG. 2*a* of the drawings illustrates the EDSR interconnected in a manner to perform a multiplication operation of two input factors X and Y. The appropriate interconnections to perform this multiplication are achieved through the function selector switch 12 which may comprise a linear array of multiple switch contacts, miniature rotary switches, keyboard switching arrangement, or the like, appropriately interconnected through printed circuit conductors to effect the input-output interconnections illustrated in FIG. 2*a*. Through similar linear switch arrays, rotary switches, etc., an operator of the EDSR presets the multiplier X and the multiplicand Y into the X and Y counters, respectively. Thereafter, by depressing the start-stop switch, power will be supplied to the EDSR and an appropriate time thereafter, a start or strobe pulse will read in the respective X and Y counts into the first and second input counters 22 and 15 while resetting the master counter 16 and the output counter 23 to zero. Thereafter, the Z counter will integrate or store the pulse rate $R_Y$, which is proportional to Y, for a period of time $T_x$ which is proportional to X. At the end of the time $T_x$, the read-out display tubes 24 will read out the contents of the Z counter in accordance with the following expressions:

$$Z=\sum_{0}^{T_x} R_y \Delta t$$

If $\Delta t$ is sufficiently small, then:

$$Z \cong \int_0^{T_x} R_y dt \cong R_c \int_0^{T_x} Y dt$$

Since $R_y = YR_c$ and is constant during $T_x$; the $Z \cong R_c Y T_x$, and since $$T_x=\frac{x}{R_c}$$

$$Z \cong \frac{R_c YX}{R_c} \cong X \cdot Y \qquad (4)$$

As an example of the operation of the EDSR in performing a multiplication, consider that $Y=0.90$, $X=0.80$, and $R_C$ is a reference rate pulsetrain having 100,000 pulses per second. With the EDSR thus conditioned, $R_Y$ will be 90,000 pulses per second and $T_x$ will be 80 milliseconds. During this time 7,200 pulses will accumulate in the Z counter which is of course the desired product. As is the case with the classical mechanical slide rule, with the elementary circuit shown in FIG. 2*a*, it is necessary for the user to locate the decimal point in the answer. Circuits for providing automatic decimal point location will be described hereinafter in connection with FIGS. 5–8.

The process of division is similar to that of multiplication, with the exception that the pulsetrains connected to the X and Y counters are interchanged in the manner shown in FIG. 2*b* of the drawings by appropriate operation of the function selector switch 12. With the counters thus interconnected, the reference rate pulsetrain $R_C$ is integrated in the Z counter, and the output pulsetrain $R_Y$ appearing at the output of the multiplier gates 17 is supplied to the input of the X counter to count this counter down for the period $T_x$ in accordance with the following:

$$T_x=\frac{X}{R_Y}=\frac{X}{R_c Y};$$

and hence $$Z \cong \int_0^{T_x} R_c dt=\frac{R_c x}{R_c Y}=\frac{X}{Y} \qquad (5)$$

As an example of the operation of the EDSR in performing division, assume that $Y=0.80$, $X=0.50$, and $R_C=100{,}000$ pulses per second. Then $R_Y$ will equal 80,000 pulses per second and $T_x$ will be $X/R_y = 62.5$ milliseconds. During this time, 6,250 pulses will accumulate in the Z counter so that $Z=0.625$ where again the operator must locate the decimal point. To prevent the Z counter from overflowing during division (as when $X$ equals values greater than $Y$), it is necessary to scale the values of $X$ and $Y$ such that $X$ is always less than $Y$. This can be done by shifting the $X$ quantity to the right with respect to its decimal point, and then properly relocating the decimal point in the answer.

FIG. 2*c* of the drawings illustrates the interconnections that are performed by the function selector switch 12 upon setting the EDSR to perform a squaring operation. The square and square root operations differ from multiplication and division in that they use a double integration. For squaring, the interconnections are similar to those for multiplication with the exception that the reference rate pulsetrain $R_C$ is first integrated by the Y counter so that the output pulse rate supplied to the output Z counter $R_W$ is $2R_Y$. To determine the square of a number $x$, the number $X$ is set into the second input or X counter 22 with the first input or Y counter 15 being reset to zero. As the EDSR operates when thus interconnected, the contents of the Y counter 15 increase linearly with time and the rate $R_Y$ increases proportionately. This rate is then integrated by the output or Z counter 23 for a period of time $T_x$ proportional to $X$. The number contained in the output or Z counter 23 at any time is proportional to the square of the integration time ($T_x^2$) and therefore is proportional to $X^2$ as set forth in the following expression:

$Y(t) \cong \int R_c dt = R_c t$. Since $R_y(t)=Y(t)R_c$ then $R_y(t) \cong R_c^2 t$. It has been shown that $$Z \cong \kappa \int_0^{T_x} R_y(t)dt=\kappa R_c^2 \int_0^{T_x} t dt,$$

or $$Z=\frac{\kappa R_c^2}{2} T_x^2$$

where $\kappa=2$ is a constant that is introduced to counteract the integration factor of ½ by doubling the pulse rate $R_y(t)$ before integrating it into the $Z$ counter. Hence:

$$Z \cong R_c^2 T_x^2 \text{ and, since } T_x=\frac{x}{R_c}$$

$$Z=X^2 \qquad (6)$$

FIG. 2*d* of the drawings illustrates the circuit interconnections performed by the function selector switch 12 to condition it to perform a square root operation. Since square root is related to squaring as division is to multiplication, the square root can be obtained by interchanging the pulsetrain signals $R_C$ and $2R_Y$ from the circuit connections shown in FIG. 2*c* to those shown in FIG. 2*d*. This change results in integrating a constant rate pulsetrain $R_C$ in the output or Z counter for a period of time $T_x$ which is proportional to the square root of $X$. Verification of this result can be determined from the following expressions:

$$Z \cong \int_0^{T_x} R_c dt = R_c T_x$$

From the description above relating to $X^2$, $$X \cong \int_0^{T_x} 2R_y(t)dt$$

Since $R_y(t) \cong R_c^2 t$ then:

$$X \cong 2R_c^2 \int_0^{T_x} tdt = R_c^2 T_x^2;\ \text{or}\ T_x = \frac{1}{—}\sqrt{X}$$

Hence:

$$Z = \sqrt{X} \quad (7)$$

Figures 2E, 2F:
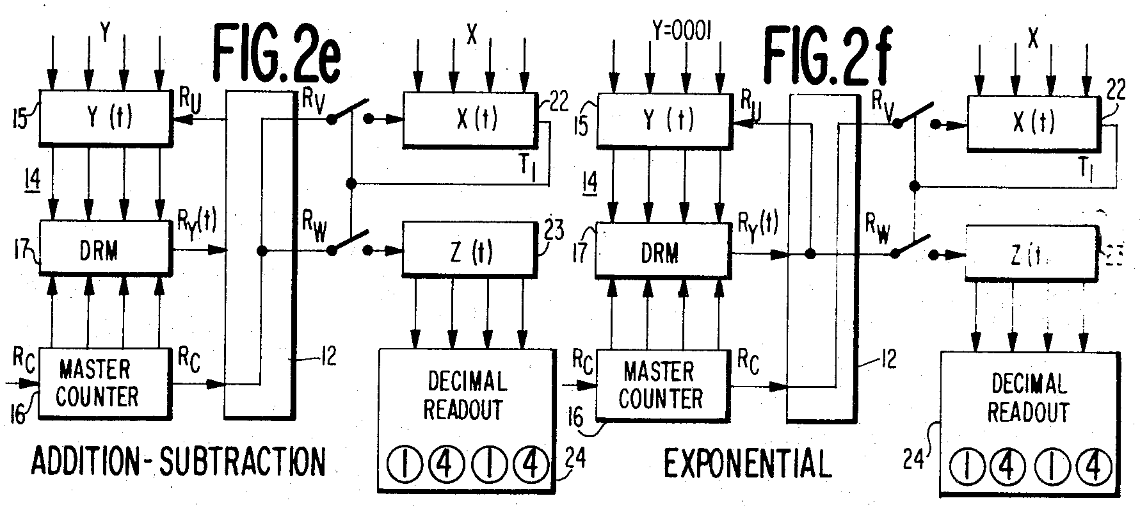

FIG. 2*e* of the drawings illustrates the structuring of the electronic digital slide rule performed by the function selector switch where the operations of addition or subtraction are to be performed. These are the simplest operations but require sequential loading of the input factors into the second or X counter 22. Addition is performed by loading a number $X$ into the X counter, and then integrating the pulse rate $R_C$ into the Z counter for the period $T_x$ required to count down the count stored in the X counter to zero. This count-down operation transfers the original number $X$ from the X counter to the Z counter. If a second number to be added to (or subtracted from) the first number $X$ is now loaded into the X counter without destroying the contents of the Z counter, this number can also be transferred to the Z counter. In the case of addition, the second number will be simply added to the $X$ number originally stored in the Z counter. This process can be repeated indefinitely as long as the contents of the Z counter are neither lost nor allowed to overflow. The first requirement is complied with by providing a "enter" control in the EDSR which, once set, will load the first number into the Z counter and then maintain power to the EDSR while a separate "add" control is operated to add additional numbers to the contents of the Z counter. The total count accumulated in the Z counter will then represent the desired summation value.

Subtraction is identical to addition with the exception that once the minuend has been "entered" and transferred to the Z counter in the previously described fashion, the Z counter must be made to count down rather than up while the subtrahend loaded into the X counter is "transferred" to the Z counter. For this purpose, there is an additional "subtract" control in the EDSR. Thus, it will be appreciated that by the provision of the "add" and "subtract" controls, it is possible to add or subtract a long string of numbers in one continuous operation with the EDSR.

FIG. 2*f* of the drawings illustrates the structuring of the EDSR by the function selector switch where it is desired to perform exponential operation. Both the exponential and logarithmic operations are simply extensions of the square and square root functions previously described. The differences are that in the case of the exponential function, the rate $R_Y$ is integrated in place of the rate $R_C$ in the Y or first input counter, and also is integrated in the output of Z counter. Accordingly, the output $R_Y$ obtained from the output of the decimal rate multiplier gates 17 is proportional to $Y(t)$ which in turn is proportional to the integral of $R_Y$. This feedback renders $Y(t)$ proportional to $e^t$. By accumulating the same rate $R_Y(t)$ in the Z counter for a period of time $T_x$ proportional to $X$, the function $Z = e^X$ is generated. To perform this operation, the value of $X$ must be loaded into the second or X counter. The first or Y counter must be preset to the decimal number 0001. The manner in which this operation is performed is set forth in the following expression:

$$Y(t) \cong 1 + \int R_y(t)dt$$

and $$R_y(t) \cong Y(t) \cong 1 + \int Y(t)dt\ \text{or}\ \frac{dT(t)}{dt} \cong Y(t)$$

which has a solution $Y(t) \cong e^t$

Since $$Z \cong \int_0^{T_x} R_y(t)dt \cong 1 + \int_0^{T_x} e^t dt$$

$$\cong 1 + e^{T_x} - 1$$

$T_x$ has been shown to be $$T_x = \frac{X}{R_c}$$

with $R_c$ connected to the $X$ counter. Hence:

$$Z + e^x \quad (8)$$

Figure 2G:
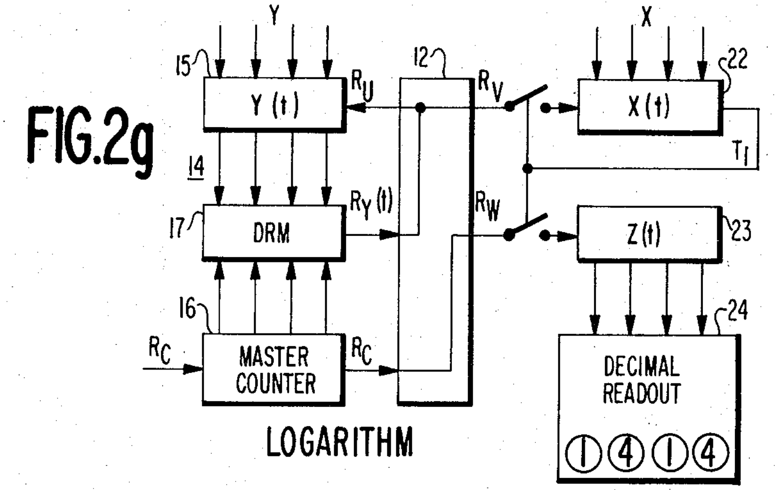

FIG. 2*g* of the drawings illustrates the structuring of the EDSR by the function selector switch in order to perform logarithmic operations. As mentioned above in connection with the exponential operation, the logarithmic operation is merely an extension of the square root function. By feeding the signal $R_Y(t)$ and $R_C$ to the second or X counter and the output or Z counter, respectively, it is possible to generate the natural logarithm of an input value $X$. In this operation, the constant $R_C$ is integrated in the Z counter for a period of time $T_x$ proportional to log $X$ to the base $e$. The first five equations set forth above with respect to the exponential operation also apply to the logarithmic operation with the additional operational steps set forth below:

$$X \cong \int_0^{T_x} e^t dt \cong e^{T_x}\ \text{or}\ \log_e X = T_x$$

$$Z = \int_0^{T_x} R_c dt \cong R_c T_x \cong \ln x \quad (9)$$

Figures 2H, 2I:
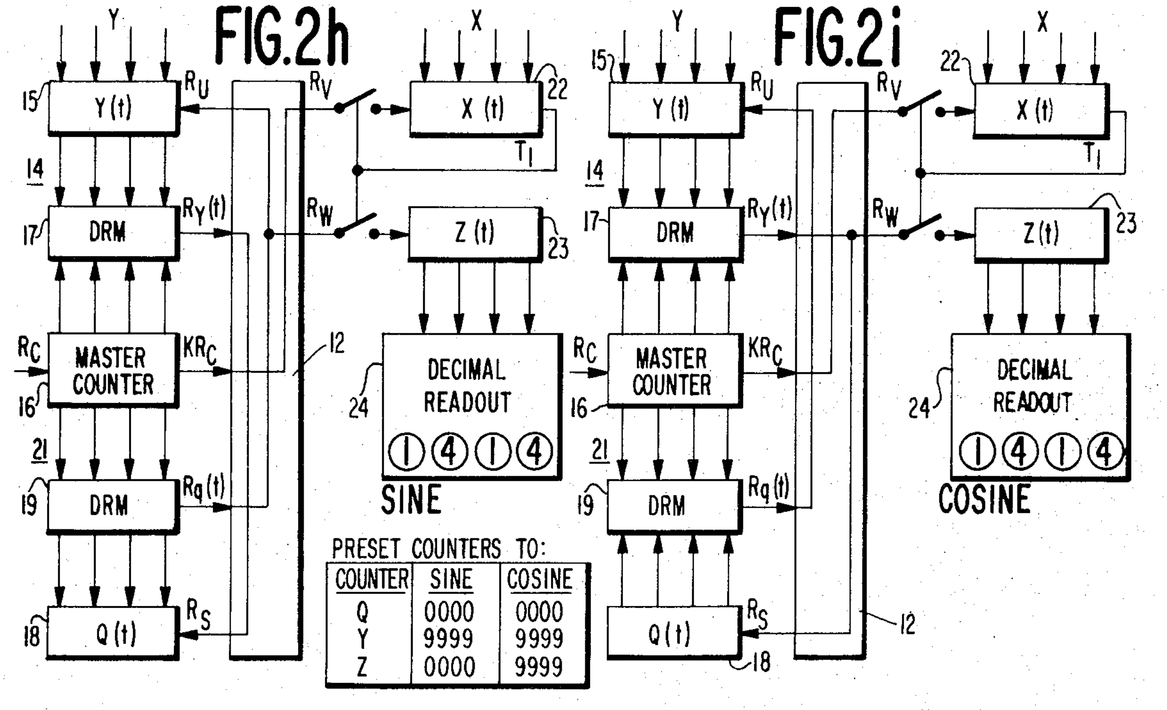

As will be seen in FIGS. 2*h* and 2*i* of the drawings, the sine and cosine functions require an additional decimal rate multiplier 21 having a third input counter 18. The third input counter 18 differs from the first and second input counters previously discussed in that it is a unidirectional "down" BCD counter. The third input counter 18 could have been implemented with the more common "up" decade counter; however such implementation would require that the decimal rate multiplier associated with it generate a pulse rate $R_Q(t)$ proportional to the nines complement of the value $Q(t)$ stored in the third input counter 18. As shown in FIG. 2*h*, to generate the sine function, the pulse rate derived from the second decimal rate multiplier $R_Q(t)$ is integrated in the output or Z counter which counts up in the normal manner for the specified period $T_x$ where $X$ is the value whose sine function is desired, and is stored as the $X$ input into the second or X counter 22. The rate $R_Q(t)$ also is cross connected to the input of the first or Y counter 15 and the output $R_Y(t)$ from the first DRM 14 is supplied back as an input to the Q or third input counter 18 to count this counter down. The chart intermediate FIGS. 2*h* and 2*i* indicates the initial settings for each of the first or Y counter 15, the third or Q counter 18 and the output or Z counter 23. Thus, it will be seen that to perform the sine function the third or Q counter is initially set to zero, the first or Y counter is initially set to the value 9999 and the output or Z counter is set to zero with the value $X$ whose sine function is to be determined being set into the second input or X counter 22. With the Y and Q counters thus initially set, the rate $R_Y(t)$ and $R_Q(t)$ will be proportional to the time integral of each other, and the solutions to their equations are a pair of functions proportional to (sine wt) and (cosine wt), where w is a function of $R_C$. Integrating either of the two rates $R_Y(t)$ or $R_Q(t)$ in the output or Z counter for a period of time $T_x$ proportional to the angle $X$, the count accumulated in the Z counter will represent the sine or cosine of $X$.

The period $T_x$ must be scaled so that an input of $X = 9{,}000$ (equivalent to $X = 90°$)yields a pulse rate for a time long enough for the Z counter to integrate from 0000 to 9999, or vice versa. To scale $T_x$, the reference rate pulsetrain $R_C$ is multiplied by some constant ($k$ less than 1) before integrating it in the X counter. It is then possible to generate the desired rate $k\ R_C$ by combining appropriate intermediate outputs of the master counter.

To generate the sine function sine $X$, the pulse rate $R_Q(t)$ is integrated in the output or Z counter. This counter counts up for the period $T_x$. To generate the cosine function cosine $X$, the pulse rate $R_Y(t)$ is integrated in the Z counter but then the counter must be counted down from a preset value of 9999. If instead, the Z counter is preset to zero for the cosine function, the output result changes by only one least significant digit (after receiving one pulse the Z counter will go back to 9999 and then proceed to count down in the usual manner). If this error can be tolerated, then the need to preset the Z counter to 9999 can be avoided. If unidirectional counters are employed to implement the EDSR, then it is possible to generate trigonometric functions only for the first quadrant (0° is equal to less than $X$ than 90°). The mathematical expressions illustrating the operation of the EDSR to perform the sine function are set forth below:

$$Y(t) = R_{Y(t)} \cong \int R_{Q(t)}dt$$

$$Q(t) = R_Q(t) \cong \int R_Y(t)dt \cong -\int\int R_Q(t)dtdt$$

from which:

$$R_Q(t) + \frac{d^2R_Q(t)}{dt^2} = 0$$

The solution of this differential expression for $R_Q(t)$ is $$R_Q(t) \cong \sin(wt + C)$$

The same solution holds true for $R_Y(t)$, except that the magnitudes of the two rates are 90° out of phase. As a result of presetting $Y(t)$ and $Q(t)$ to 0000 and 9999, respectively, $R_Y(t)$ becomes $R_Y(t) \cong \sin wt$ and $R_Q(t) \cong \sin(wt + 90°) = \cos wt$ For the sine function:

$$Z \cong \int_0^{T_x} R_Q(t)dt = \int_0^{T_x} \cos wtdt$$

$$Z \cong \sin(wT_x) - \sin 0$$

or since $T_x$ is proportional to $X$ suitably scaled:

$$Z = \sin X \quad (10)$$

For the cosine function:

$$Z \cong -\int_0^{T_x} R_Y(t)dt$$

$$Z \cong \int_0^{T_x} \sin wtdt = + \cos wt \Big|_0^{T_x}$$

$$Z = \cos(wT_x) - 1$$

and since the $Z$ counter was present to 9999

$$Z = \cos X \quad (11)$$

To generate the cosine function cosine $X$, the pulse rate $R_Y(t)$ is integrated in the Z counter for a period of time $T_x$ proportional to the angle $X$. However, for the cosine function, the Z counter is counted down by the pulse rate $R_Y(t)$ from the preset value of 9999.

Figure 3:
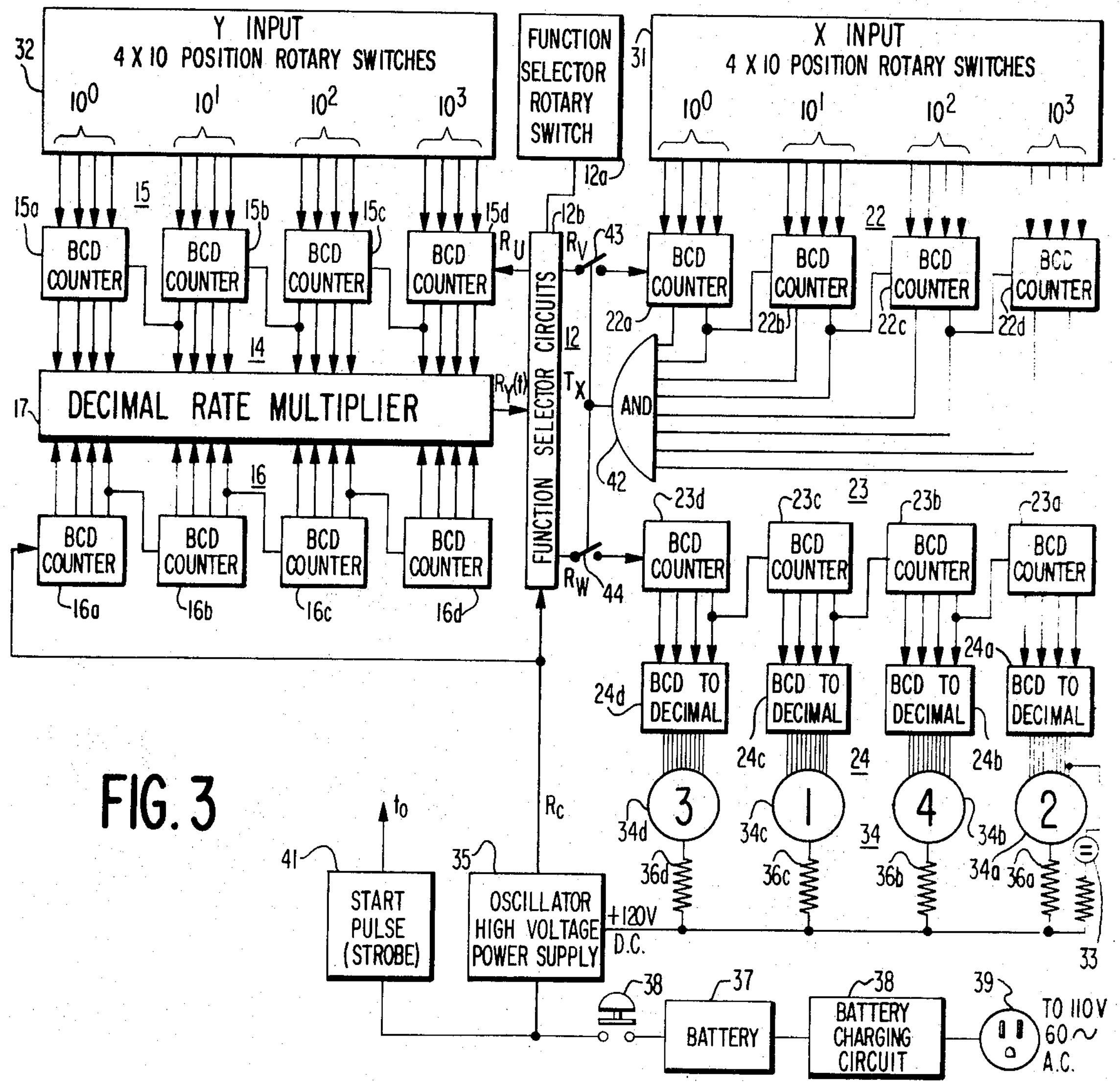
FIG. 3 is a more detailed functional block diagram of the several circuit components of the electronic digital slide rule illustrating its construction in greater detail.

FIG. 3 is a more detailed functional block diagram of an electronic digital slide rule constructed in accordance with the invention. In FIG. 3, suitable switches are integrated by blocks 31 and 32 for setting the variables $X$ and $Y$ into the EDSR. Each of the switches 31 and 32 may be made up of four 10-positions miniature rotary thumbwheel switches. These miniature rotary thumbwheel switches encode each of the ten positions as binary coded decimal signals which then are connected to the preset input terminals of the respective $X$ and $Y$ input counters 22 and 15. The X counter 22 is made up of four decades of BCD counters (binary-coded-decimal counters) such as the integrated circuit, presettable BCD counting stages manufactured and sold by Signetics Corporation, and known as the S1280 IC counter. These prefabricated, integrated circuits BCD counters are commercially available items which operate in a known manner. The counters are serially connected to form an overall counter arrangement such as shown at 22 having any desired capacity. The X counter 22 comprises a four-decade counter wherein the counter stage 22a comprises the units counting stage, the counting stage **22*b* comprises the tens counting stage, the counting stage 22*c* comprises the hundreds counter and the counting stage 22*d* comprises the thousands counter. This same arrangement is true of the $Y$, the master and the output counters to be described hereinafter. The X counter 22** has been described as generating the integration time $T_i$ by counting down from the value of $X$ (preset in the X counter during time $T_O$) until the contents of the counter is 0. However, because the BCD counting stages available as integrated circuits operate only to count up, it is necessary to generate the integration time $T_i$ by presetting the X counter to the nines complement of the value of X, and then counting up to the value 9999.

The embodiment of the invention shown in FIG. 3 is not capable of performing the sine and cosine functions in that it employs only one decimal rate multiplier 14 which is made up of the first or Y input counter 15, the master counter 16 and the decimal rate multiplier gating logic 17. The master counter 16 is comprised of four decade stages of commercially available, integrated BCD counting units such as the Texas Instruments Inc. SN 7490 counter since it is a unidirectional ripple counter, and can be implemented with almost any of the available BCD counting units. However, the Y counter 15 must be capable of being preset to any desired 4-decade BCD number, and hence its 4-counting stages must be of a type similar to the Signetics S1280 counter used in fabricating the X counter. The decimal rate multiplier 14 employs an average of three integrated circuits per decade including the counter stages and the associated gates required to produce the output pulse rate $R_Y(t)$.

The output or Z counter 23 is comprised of a 4-stage unidirectional counter which must be reset only at time $T = 0$ and therefore can be built from integrated circuit counter stages such as the Texas Instruments Inc. SN 7490. A small NE2 neon lamp shown at 33 may be connected to the 9-output of the most significant stage, and will indicate when the Z counter overflows. By counting the number of times that the neon lamp 33 lights, it is possible to derive a measure of the magnitude of the Z output even when it exceeds the capacity of the counter. In order to display the value of the count contained in the Z counter 23, the outputs of the 4-decade counter stages **23*a*–*23d* must be converted into decimal form. For this purpose, a plurality of BCD to decimal converters such as the Texas Instruments Inc. SN 7441 integrated circuit converter shown at 24*a* – *24d* are connected to the respective count producing output terminals of the 4-decade stages 23*a*–23 of output counter 23. The BCD converters 24*a*–24*d* not only perform the conversion for a whole decade of output counter 23, but also contain suitable amplifier driver stages for driving the Nixie tube display comprised by the Nixie tubes 34*a*–34. The four miniature B–4021 Nixie tubes (a multicathode gas tube or indicator made by Burroughs) display the decimal value of the count recorded in the output or Z counter 23**.

In order to provide power for operating the Nixie tubes 34a–34, a power supply providing 120 volts at 0.7 of a milliamp minimum is shown at 35 and is connected through suitable limiting resistors 36a–36d to the respective Nixie tubes 34a–34. The power supply 35 comprises a miniature ferrite core transformer plus five or so discrete components which form a transformer coupled oscillator. This same oscillator generates the clock pulse or reference rate pulsetrain $R_C$ having a frequency of approximately 250 kilohertz. With a clock pulse reference rate frequency of this order, the ESDR can perform about any arithmetic operation in less than 0.1 seconds.

The power supply circuit 35 is supplied from a battery power source 37 through a push-button on-off switch 38. The battery power source 37 may comprise a 4, 1-ampere-hour nickel-cadmium battery that supplies the required 5-volt, 800-milliampere power requirements of the EDSR. Preferably, a built-in battery charging circuit 38 is provided for connection through the terminal 39 to a conventional 110 volt, 60 cycle alternating current source for recharging the battery 37 during periods of non-use. The output from battery 37 supplied through push-button switch 38 also is supplied to a start pulse or strobe pulse generator 41 which produces the start or strobe pulse $t_o$ whenever the push-button switch 38 is depressed to supply power to the EDSR. This generator may consist of a tunnel diode and a few other discrete components.

The function selector switch 12 may be comprised by a 4-pole, 6-position miniature rotary switch 12a which operates through its movable contact to interconnect a plurality of conductor paths shown generally at 12b in a desired manner to provide the various interconnections described above for the different mathematical operations selected through the medium of the function selector switch 12a. Five of the six positions of this switch serve to interconnect the pulse rate generator comprised by the Y and master counters 15 and 16 and gates 17 with the output counter 23 and the X counter 22, while a remaining contact serves to turn power off of the system. Additional or different multi-position switches may be employed determined by the number and nature of mathematical operations to be performed by the EDSR. The integrator-timer function of the X counter 22 is performed through suitable logic gates such as shown at 42 to control supply of the count-down (or count-up) pulsetrain through a gate 43 supplying the count input terminal to the X counter 22, and controlling the supply of output pulsetrains $R_W$ representing the count to be integrated to the Z or output counter 23 through a gate 44. It will be appreciated therefore that the output from the AND gate 42 which in effect is controlled by the count contained in the X counter 22 in turn controls the timing of the input pulsetrain to both the X counter and the output Z counter 22 and 23, respectively.

During operation of the EDSR, the function selector rotary switch 12a is rotated to a desired function to be performed thereby enabling or structuring the EDSR to perform the desired mathematical operation. The input variables *X* and *Y* are then placed into the rotary switches 31 and 32 which also serve as memory devices. At this point, the push-button 38 may be depressed in order to supply power to the EDSR, and the start pulse generator 41 will produce the start or strobe pulse $T_O$. This single pulse is produced whenever the power is turned on and is kept on until all fluctuations and contact bounce have subsided, and for a period of time required to carry out the desired mathematical operation. At time $T_O$, the start pulse resets the master counter to zero. Simultaneously, the magnitude of the *Y* is transferred from the rotary switches 32, to the 4-decades of the Y counter 15. Similarly, the magnitude of the X value is transferred from the rotary switches 31 into the X counter 22. Thereafter, the EDSR will operate in any of the previously described fashions to derive a desired output solution in the output or Z counter 23 of the function to be performed.

Figures 4A, 4B:
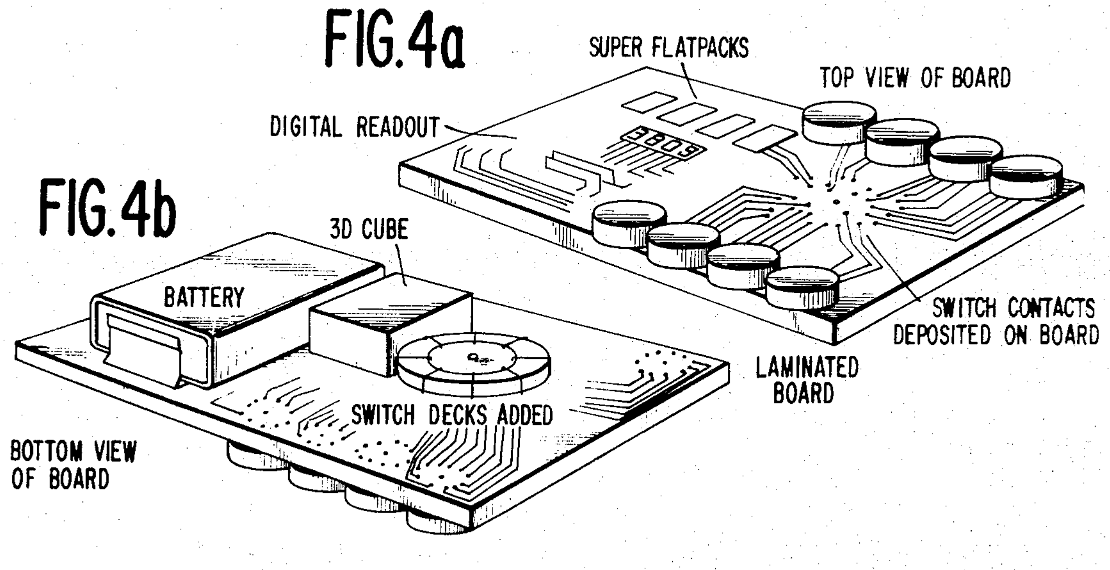
FIG. 4 is a perspective view of the physical form of an electronic digital slide rule constructed in accordance with the invention.
Figure 5:
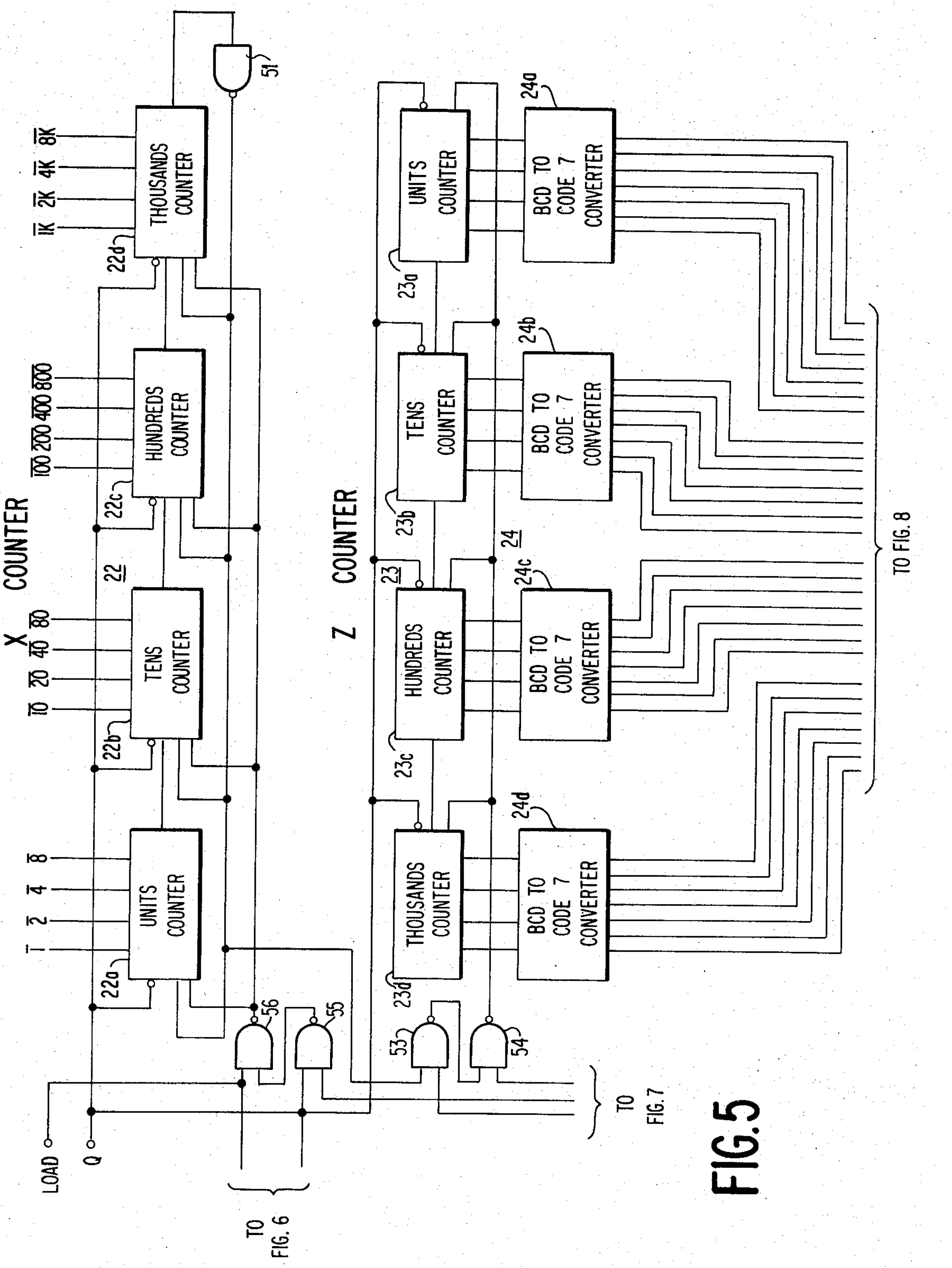
FIG. 5 is a detailed logical circuit diagram of the construction of one input counter (X counter) the output counter and the BCD to Code 7 decimal converter used in constructing a preferred embodiment of the invention.

FIG. 4 of the drawings is a perspective view of the top and bottom surfaces of a single printed circuit board which forms the chassis for the EDSR and has the various component parts shown in FIG. 3 mounted thereon together with the necessary printed circuit conductors to interconnect the component parts in the various manners described. From a consideration of FIG. 4, it will be appreciated that the EDSR is capable of being fabricated in micro-miniaturized circuit form so that it readily can be packaged within a hand-carried size container or housing for ready portability and use. It is desirable that the complete device occupy less than 20 cubic inches of space, weigh less than one pound, and require less that one watt of power. From the above set forth description, it will be appreciated that these design considerations are met with the proposed EDSR.

FIGS. 5–8 of the drawings comprise a detailed logical circuit diagram illustrating the construction of a preferred embodiment of EDSR constructed in accordance with the invention. The EDSR shown in FIGS. 5–8 is capable of the operations of addition, multiplication, division, squaring, square root, exponential, and logarithmic functions. In addition to performing these operations and providing an output indication of the solution through the medium of indicating lamps, the EDSR shown in FIGS. 5–8 also includes a decimal point placement capability which indicates the placement of the decimal point in the solution displayed by the indicating lamps.

The EDSR shown in FIGS. 5–8 is comprised of an X counter, 22, formed by four serially interconnected decade counting stages 22a–22d that are comprised of commercially available integrated circuit counters such as the Fairchild 9310, manufactured and sold by the Fairchild Camera Company. Each of the decade counting stages 22a–22d is capable of being preset to any desired BCD number so that the overall X counter arrangement can be preset to a 4-decade BCD number. The count presetting input terminal of each of the decade stages are connected to the respective count setting output terminals of a manual input switching device (not shown) which may comprise a recti-linear switching device, a miniature rotary switching device, a keyboard switching device, or some other similar manually operated switching device for reading into the counters the desired value to be stored. The output from the X counter is supplied from the last or thousands counting stage 22d back through an inverter 51 to the electronic count-enable terminals of all of the counting stages 22a–22d to halt the counting following completion of a counting operation. As mentioned previously, because the counting stages 22a–22d normally value of *X* in the X counter, and then count out the value of *X* by counting up to 9999. Upon reaching this value, the X counter contents are then frozen in the above described manner.

The embodiment of the invention shown in FIGS. 5–8 is designed to display the average of 10 repeated computations in determining the product or quotient during multiplication and division operations. For this reason, a divide-by-10 counter circuit shown at 52 is provided at the output of the decimal rate multiplier logic 14 for dividing the rate $R_Y$ by a factor of 10. This $R_Y/10$ rate is then supplied through the function selector switches shown as a series of circles marked Ⓐ Ⓜ Ⓓ Ⓢ Ⓡ Ⓔ and Ⓛ As might be expected, these coded switch contacts when closed in accordance with the setting of the function selector control perform the operation in accordance with the following code arrangement:

Ⓐ— Addition
Ⓜ— Multiplication
Ⓓ— Division
Ⓢ— Squaring
Ⓡ— Square Root
Ⓔ— Exponential
Ⓛ— Logarithmic In accordance with the above code sequence, it will be seen that for the multiplication operation, the $R_Y$ divided by 10 rate will be supplied through the Ⓜ contact to one input terminal of a NAND gate 53 whose output is supplied through a second NAND gate 54 to count input terminals of the plurality of counting stages 23$a$–23$d$ that comprise the Z or output counter 23. Simultaneously with the $R_Y/10$ pulsetrain, the X counter input NAND gate 55 also has supplied thereto a pulsetrain equal to $f_c/10$ where $f_c$ is the reference rate pulsetrain derived by the clock pulse oscillator 35 shown at the left hand portion of FIG. 8 of the drawings. This $f_c$ pulsetrain is supplied to the master counter 16 shown in FIG. 6 and at the output of the first counting stage 16$a$ thereof, the $f_c/10$ pulserate is derived and is supplied through the function selector switches to the input of an X counter input NAND gate 55. This NAND gate has its output connected through a second X counter input NAND gate 56 whose output then supplies the input count-up $f_c/10$ pulses to the count-up input terminals of the X counter 22. These $f_c/10$ count-up input pulses are applied synchronously to the count-up input terminals of all of the counting stages 22$a$–22$d$, however, at any given time only selected ones of the counting stages will be enabled to increment depending upon the count accumulated in the X counter by reason of an enabling potential supplied from the output of a previous less significant stage to an input enabling terminal of the next significant stage. The count complete turn-off pulse appearing at the output of the inverter 51 is also supplied to one input of NAND gate 52 along with the previously mentioned $R_Y/10$ input to allow the count in X counter 22 to control the integration time of the $R_Y/10$ count being read into the Z counter 23.

Figure 6:
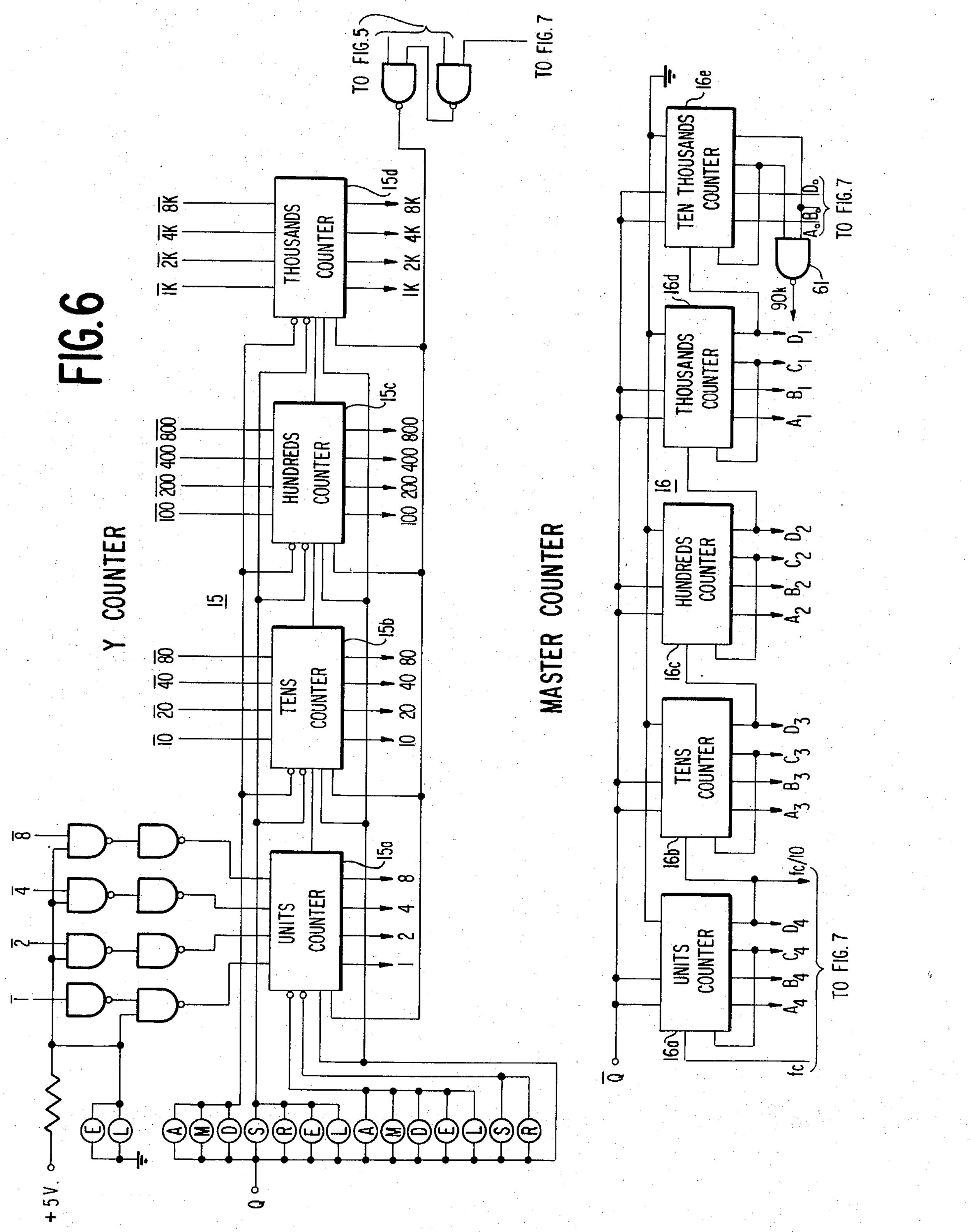
FIG. 6 is a detailed logical circuit diagram of another input counter (Y counter), the master counter and certain logic switching connections also comprising a part of the preferred electronic digital slide rule that includes the circuit elements of FIG. 5.
Figure 7:
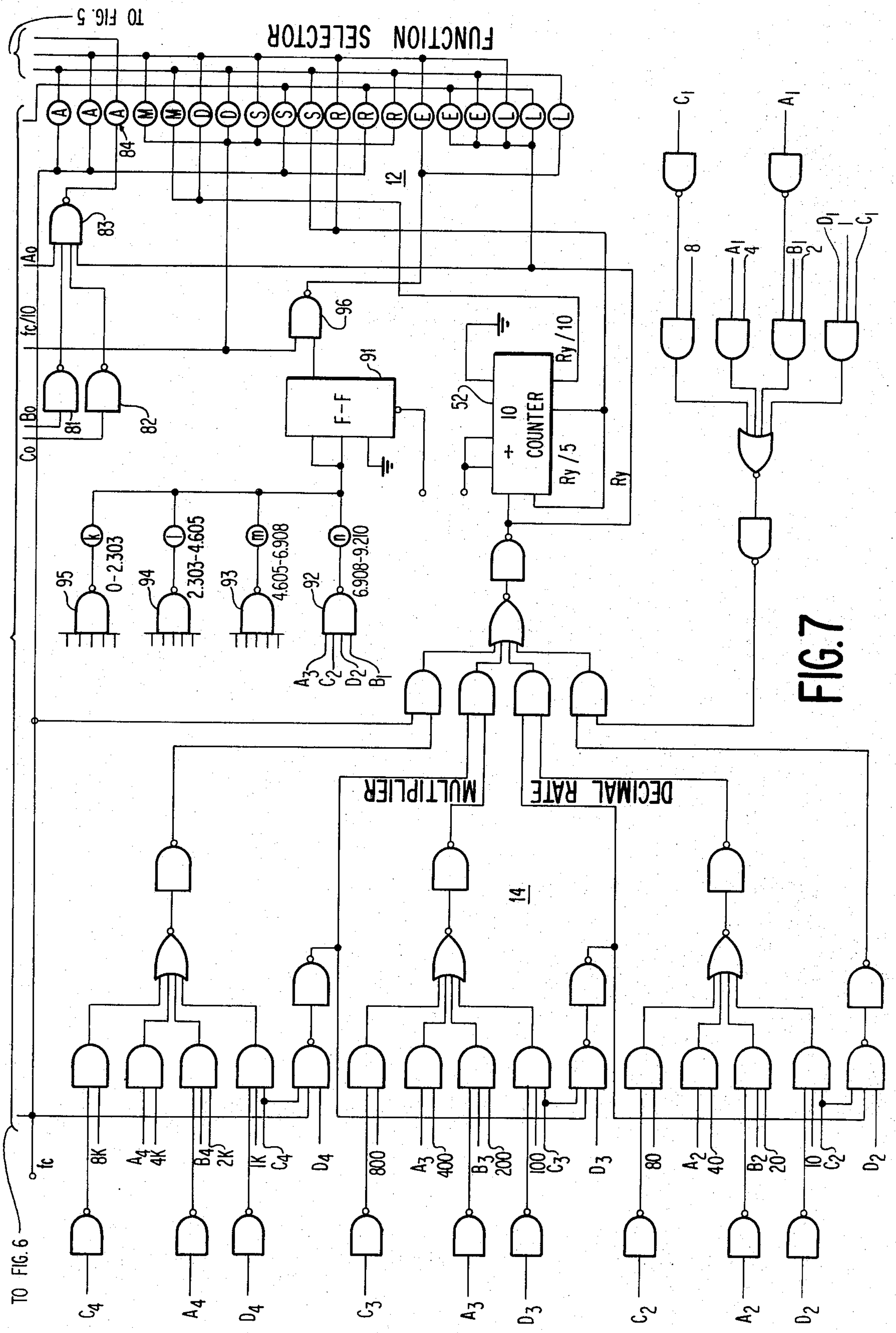
FIG. 7 is a detailed logical circuit diagram of the decimal rate multiplier and function selector switching means comprising a part of the preferred embodiment of electronic digital slide rule shown also in FIGS. 5 and 6.

As described previously, the $R_Y$ ( and hence the $R_Y/5$ or $R_Y/10$ ) pulse rate is determined by the setting of the Y counters 15 shown in FIG. 6 of the drawings. Y counter 15 is comprised of a 4-decade counter formed by four interconnected Fairchild 9310 integrated circuit counter stages whose count setting input terminals are connected to and controlled by the Y count input switching devices (not shown) that may comprise miniature rotary switches, recti-linear switch devices having multiple contacts, etc. The digital count producing output terminals marked 1, 2, 4, 8, 10, 20, 40, 80, etc. are connected to selected ones of the input terminals of a plurality of NAND gates that comprise the decimal rate multiplier gating logic circuitry 14 shown in FIG. 7 of the drawings. These NAND gates also have supplied thereto selected one of the divided down pulsetrains appearing at the output terminals of the master counter 16 shown in FIG. 6. By selectively combining these pulsetrains through the control of the Y counter, an output pulsetrain $R_Y$ is produced at the output of the decimal rate multiplier 14 whose repetition rate is representative of the reference repetition rate pulsetrain $f_c$ multiplied by the setting of the Y counter 15 as is well known in the electronic digital pulse circuitry art. This pulsetrain $R_Y$ is then supplied either directly or through the divide by 10 circuit 52 to the several function selector switch contacts 12Ⓐ, 12Ⓜ, 12Ⓓ, etc., for the distribution to either the X or Y or Z counter as determined by the setting of the function selector switch in accordance with the previously described operational modes of which the EDSR is capable.

Returning again to the prior description of operation of the EDSR while performing a multiplication of two values $X$ and $Y$, it will be noted that the decimal rate multiplier 14 is followed by a special counter stage 52 which serves to divide $R_Y$ by 10, thus providing one tenth the rate to the Z counter. By accumulating this rate for ten times as much time, non linearities in the rate $R_Y$ are smoothed out. It is this special counter which allows the EDSR to obtain an average count over 10 cycles of operation in the previously described manner so that the count accumulated in the Z counter 23 will be the average of 10 cycles of operation. Upon the tenth operating cycle being completed, an enabling potential will be supplied from the output of the counter 22$d$ to a NAND gate 51 whose output enables or disables the counting of the X and Y counters. This prevents any further increase in the count accumulated in the Z counter 23. The BCD count accumulated in Z counter 23 will then be converted by the BCD to code 7 ( or other appropriate code ) converters 24$a$–24$d$ and displayed by indicating lamps 34 which may comprise, and suitable visual display for indicating the value of the count in the decimal number system. Such Code Seven converters are well-known, commercially available devices. One typical BCD Code Seven converter is sold by the Fairchild Semiconductor Division (Mountain View, California) of the Fairchild Camera & Instrument Corp. under their designation 9307 MSI SEVEN SEGMENT DECODER.

In addition to displaying the decimal numeral value of the solution of a particular operation performed by the EDSR, the display further includes a plurality of decimal point placement indicating lamps 71–75 which are connected in circuit relationship with a static switching system whose switch contacts are indicated by the small circles with the capital letters Ⓐ, Ⓜ, Ⓓ, Ⓡ, Ⓢ, Ⓔ and the lower case letters $a$, $b$, $c$, $d$, $e$, $f$, $g$, $h$, $i$, $j$, $k$, $l$, $m$, and $n$. The switch contact denoted by Ⓜ, Ⓐ, Ⓓ etc. all are operated simultaneously with the function selector switch. However, the lower case switch contacts identified by the ⓐ ⓑ ⓒ etc., are operated by placing the decimal point in the input $X$ and/or $Y$ values registered in the X and Y counters. With a 4-digit output, there are five possible positions for the output decimal point denoted by the Greek letters $\alpha$, $\beta$, $\gamma$, $\delta$, $\epsilon$. Each of these output decimal point positions can be described by one Boolean equation. Depending upon whether the EDSR is structured to multiply, divide, etc., and depending upon where the input X and Y decimal points are located, the five equations will be solved and one (or none) of the five decimal points will be lighted. If the output decimal point is determined to lie outside the range of the five allowable locations, none of the lights will light, and the decimal point location will have to be determined by the operator manually. In the embodiment of the invention shown in FIG. 8, the decimal point location equations are implemented with mechanical switch contacts, however they can be readily implemented with conventional and/or gating logic, relays, or other similar implementation.

It is anticipated that both the X and Y inputs will consist of four digits. Therefore, there can be five possible decimal point locations for both the X and Y inputs. The location of the decimal point for the X and Y inputs with respect to the Z output decimal point is as follows:

$$X = \begin{array}{ccccccccc} \cdot & 3 & \cdot & 4 & \cdot & 2 & \cdot & 0 & \cdot \\ \uparrow & & \uparrow & & \uparrow & & \uparrow & & \uparrow \\ a & & b & & c & & d & & e \end{array}$$

$$Y = \begin{array}{ccccccccc} \cdot & 5 & \cdot & 7 & \cdot & 6 & \cdot & 8 & \cdot \\ \uparrow & & \uparrow & & \uparrow & & \uparrow & & \uparrow \\ f & & g & & h & & i & & j \end{array}$$

---

$$Z = \begin{array}{ccccccccc} \cdot & 1 & \cdot & 9 & \cdot & 7 & \cdot & 3 & \cdot \\ \uparrow & & \uparrow & & \uparrow & & \uparrow & & \uparrow \\ \alpha & & \beta & & \gamma & & \delta & & \epsilon \end{array}$$

The five equations for $\alpha$, $\beta$, $\gamma$, $\delta$ and $\epsilon$ are as follows: $\alpha = Aa + Maf + D(af + bg + ch + di + ej) + Sa + Ra$ $$\beta = Ab + M(ag + bf) + D(bf + cg + dh + ei) + R(b + c) + Ek + L$$

$$\gamma = Ac + M(ah + bg + cf) + D)cf + dg + eh) + Sb + R(d + e) + E1$$

$$\delta = Ad + M(ai + bh + cg + df) + D(df + eg) + Em$$

$$\epsilon = Ae + M(aj + bi + ch + dg + ef) + Def + Sc + En$$

If, in our example, we multiply $$Z = (3 \cdot 420) \times (57 \cdot 68) = 1\ 9\ 7 \cdot 3$$

$$\begin{array}{ccc} \uparrow & \uparrow & \uparrow \\ b & h & \delta \end{array}$$

Figure 8:
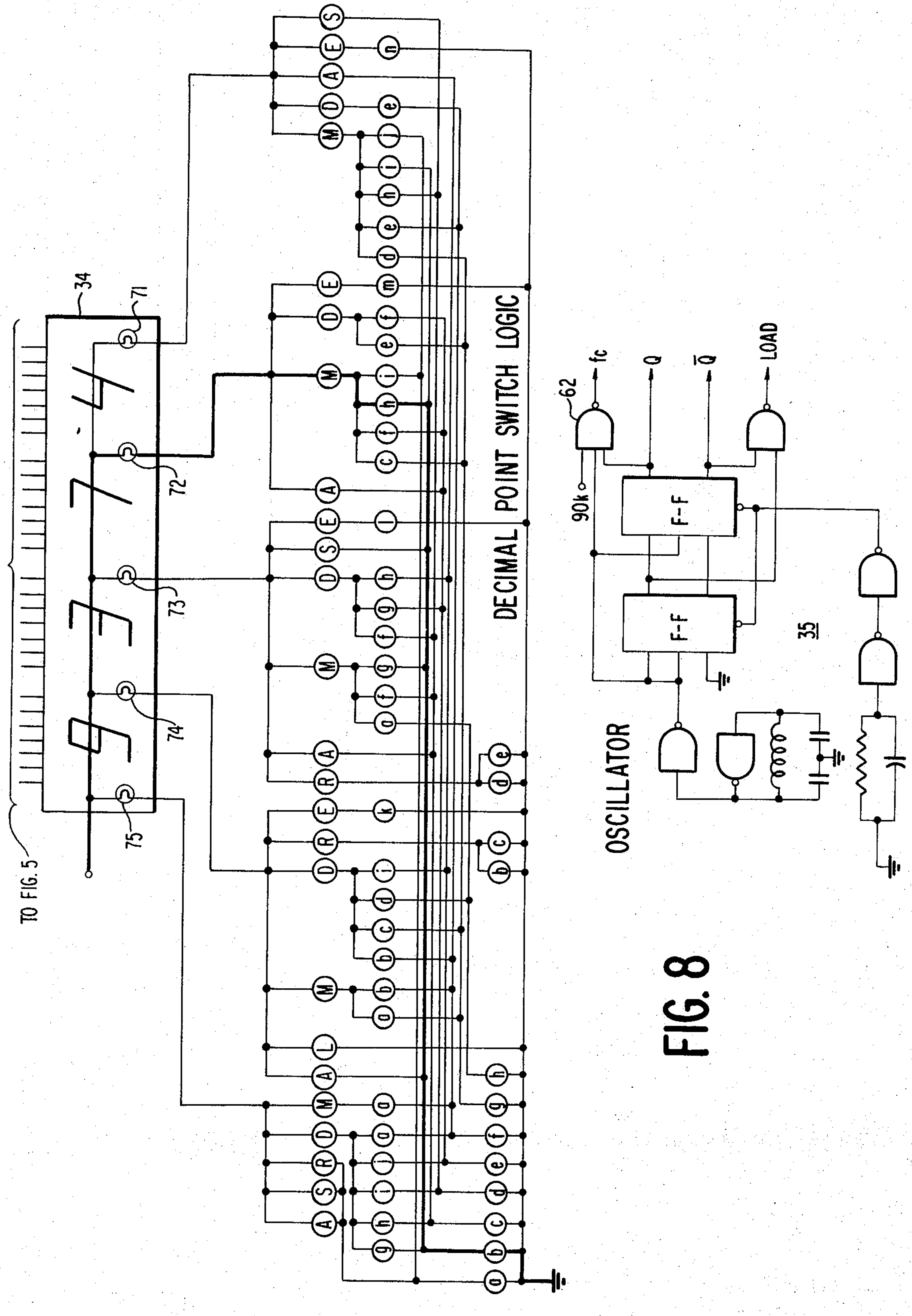
FIG. 8 is a detailed logical circuit diagram of the construction of the decimal point indicating circuit and the reference rate pulsetrain generator circuit comprising a part of the preferred form of electronic digital slide rule which further includes the circuits of FIGS. 5–7.

From operation of the decimal point placement circuitry, it will be seen that the product Z for the two input factors $X = 3.420$ and $Y = 57.68$ is given by the expression $Z = (3.420) \times (57.6) = 197.3$, the switches $b$, $h$ and $M$ (multiply) are closed, and in accordance with the schematic arrangement shown in FIG. 8, the δ light or indicating lamp 72 will be lighted. The circuit connections making the lighting of this lamp possible are shown in heavy line form to facilitate tracing out the circuit.

Having described above the operation of the embodiment of the EDSR shown in FIGS. 5–8 for a multiplication operation, the manner in which the circuits perform other operations such as addition, division, etc., is believed to be obvious in the light of the earlier description in connection with the FIG. 2 drawings. Hence, a detailed tracing out of the circuitry of FIGS. 5–8 in connection with all of the various operations of which the circuit is capable, is believed unnecessary. It might be noted that with respect to the addition operation, the circuit employs a pair of inverter gates 81 and 82 shown in FIG. 7 whose output supplies a 4-input NAND gate 83 that is further enabled with the $R_Y$ reference rate pulsetrain and the output from the special counter 16*e* which enables NAND gate 83 only during the second 10,000 counting cycle of a counting operation of the master counter. The output from NAND gate 83 in turn is supplied only through the additional (A) contacts 84 to one input of the NAND gate 54 shown in FIG. 5 to allow this NAND gate to function as an inverter and connect the $R_Y$ pulsetrain to the Z counter only during the addition operation. In this way, the *Y* value can be added to the *X* value already accumulated in the Z counter during the first 10,000 pulses of an a addition operation.

In addition to the above described circuit elements, the EDSR shown in FIGS. 5–8 further include scaling circuitry comprised by a flip-flop 91 supplied from a plurality of NAND gates 92, 93, 94 and 95 which serve to inhibit the pulsetrain $f_c/10$ for a predetermined amount of time depending on the range of the exponential or logarithmic number computed during exponential and logarithmic operation by appropriately enabling a NAND gate 96 to which the $f_c/10$ repetition rate pulsetrain is supplied as an input, and whose output is supplied through the (E) and (L) function selector switch contacts to the input NAND gate 55 of X counter 22 or, alternatively, to the input NAND gate 53 of Z counter 23 during exponential and logarithmic operations. The amount of scaling is determined by which of the NAND gates 92–95 is allowed to control the operation of flip-flop 91 through the selector switch contacts (k) (l) (m) or (n) which may comprise a part of the static switching system used to implement the decimal point placement circuitry.

Having described several embodiments of an electronic digital slide rule constructed in accordance with the invention, it will be appreciated that the invention makes available an instrument capable of performing a wide variety of mathematical operations such as addition, subtraction, multiplication, division, squaring, square root, as well as deriving solutions to exponential, logarithmic and trigonometric functions. The electronic digital slide rule makes available an instrument which can be hand-carried or used as a desk top aid to the ready, quick and accurate solution of problems of the above type not otherwise requiring or economically justifying the use of more sophisticated computer systems. Additionally, the invention makes available an electronic digital slide rule having the characteristics enumerated above but which further includes the capability of indicating to the user the proper placement of the decimal point in the solution of calculations performed by the instrument.

Accordingly, having described several embodiments of a novel, electronic digital slide rule constructed in accordance with the invention, it is believed obvious that other modifications and variations of the present invention are possible in the light of the above teachings. It is therefore to be understood that changes may be made in the particular embodiments of the invention described which are within the full and intended scope of the invention as defined by the appended claims.

What is claimed is:

1. An electronic digital slide rule comprising pulse rate generating circuitry for producing an information bearing pulse train whose repetition rate is representative of an input factor, said pulse rate generating circuitry including first factor input means, a master counter responsive to a reference pulse rate and at least one digitally operable multiplier and counter arrangement, said arrangement including a first input counter responsive to said first factor input means and multiplier gates controlled by said first input counter and said master counter, said arrangement producing said information bearing pulsetrain from said gates; output integrator and timing circuit means including second factor input means, a digitally operable second input counter responsive to said second factor input means coupled to and controlling, at least in part, operation of said integrator and timing circuit means, and a digitally operable output counter; and, function selector switching means interchangeably interconnecting said pulse rate generating circuitry, said second input counter and said output counter in any one of a plurality of more than two combinations as required to perform any selected one of a plurality of different arithmetic operations using factors introduced through said factor input means to produce a solution as a count on said output counter.

2. An electronic digital slide rule according to claim 1 wherein the function selector switching means connects said reference pulse rate to the input of the second input counter and connects said information bearing pulsetrain from the multiplier gates of the pulse rate generating circuitry to the input of the output counter for a period of time required to count the contents of the second input counter down to zero whereby the solution appearing in the count registered in the output counter represents the product of a factor applied to said first factor input means multiplied by a factor applied to said second factor input means.

3. A digital electronic slide rule according to claim 1 wherein said function selector switching means connects said reference rate to the input of the output counter and connects said information bearing pulsetrain from the multiplier gates of the pulse rate generating circuitry to the input of the second input counter for counting down the second input counter with said pulsetrain while supplying said reference pulse rate to the input of the output counter for a period of time required to count down the second input counter to zero value whereby the count registered in the output counter represents the quotient obtained by dividing a factor supplied to the second input counter by a factor supplied to the first input counter.

4. An electronic digital slide rule according to claim 1 wherein said function selector switching means is sequentially operated to connect said reference pulse rate to the input of the output counter for a period of time required to count down the contents of the second input counter for two successive count values applied to the second input counter and wherein the two successive values represent values to be added or subtracted with the second count being added to or subtracted from the first count registered in the output counter dependent upon whether an addition or subtraction operation is carried out.

5. A digital electronic slide rule according to claim 1 wherein said function selector switching means connects said reference pulse rate to the input of both the first and second input counters with the first input counter being initially set to zero and with the second input counter being initially set to a value to be squared and connects said information bearing pulsetrain from the multiplier gates to the input of the output counter for a period of time required to count down the contents of the second input counter to zero whereby the contents of the first input counter is increased linearly with time to thereby increase the pulse rate of said information bearing pulsetrain to the output counter proportionately and produce a count in the output counter which is proportional to the square of the value to which the second input counter was initially set.

6. A digital electronic slide rule according to claim 1 wherein said function selector switching means connects said reference pulse rate to the input of the first input counter and to the input of the output counter with the first input counter being initially set to zero and the second input counter being initially set to the value whose square root is sought, the reference pulse rate being thus connected for a period of time required to count down the contents of the second input counter with said information bearing pulsetrain whose repetition rate increases linearly with time, said function selector switching means further connecting the information bearing pulsetrain to the input of the second input counter to count down the contents of the second input counter whereby the count accumulated in the output counter represents a value proportional to the square root of the count registered in the second input counter.

7. A digital electronic slide rule according to claim 1 wherein said function selector switching means connects said reference pulse rate to the input of the second input counter having a value stored therein representative of the exponent in the expression $Z=e^x$, and further connects the information bearing pulsetrain back to the input of the first input counter which is initially set to the value 1 and also connects the information bearing pulsetrain to the input of the output counter, which is also set to the decimal number 1, for a period of time required to count the contents of the second input counter down to zero value whereby the count accumulated in the output counter is representative of the value Z in the expression $Z=e^x$.

8. A digital electronic slide rule according to claim 1 wherein said function selector switching means connects the information bearing pulsetrain back to the inputs of both the first input counter and the second input counter while starting with the decimal number 1 stored in the first input counter and in the output counter and a value $x$ whose natural logarithm is to be determined initially placed in the second input counter, said function selector switching means also connecting said reference pulse rate to the input of the output counter for a period of time required to count the contents of the second input counter down to zero whereby the count registered in the output counter will be proportional to the natural logarithm of the value $x$ placed in the second input counter.

9. A digital electronic slide rule according to claim 1 wherein said pulse rate generating circuitry includes an additional multiplier and counter arrangement comprising a third input counter and a second set of multiplier gates interconnected with said master counter for producing another information bearing pulsetrain, said function selector switching means connects said reference pulse rate to the input of the second input counter which is initially set to a value whose sine function is desired, connects the information bearing pulsetrain from the first set of multiplier gates to the input of the third input counter which is initially set to zero, and connects the information bearing pulsetrain from the second multiplier gates to the input of the first input counter which is initially set to the decimal value 9999 and to the input of the output counter which is initially set to zero for a period of time required to count down the contents of the second input counter to zero value whereby the count accumulated in the output counter will be proportional to the sine of the value initially set in the second input counter.

10. An electronic digital slide rule according to claim 1 wherein said pulse rate generating circuitry includes an additional multiplier and counter arrangement comprising a third input counter and a second set of multiplier gates interconnected with said master counter for producing another information bearing pulsetrain, said function selector switching means connects said reference pulse rate to the input of the second input counter which is initially set to the value whose cosine is desired, connects the information bearing pulsetrain from the second multiplier gates to the input of the first input counter which has the value 9999 initially placed therein and connects the information bearing pulsetrain from the first multiplier gates to the input of the third input counter which has the value of zero initially placed therein and to the input of the output counter which has the value 9999 initially placed therein for a period of time required to count down the contents of the second input counter to zero value whereby the count accumulated in the output counter will be proportional to the cosine of the value registered in the second input counter.

11. An electronic digital slide rule according to claim 1 wherein said first and second factor input means include manually operable mechanical switches having a plurality of discrete contact positions which also serve as input memory devices for retaining the value of the input factors.

12. A digital electronic slide rule according to claim 1 wherein said multiplier gates employed in the slide rule constitute decimal rate multipliers utilizing binary coded decimal counters, and said output counter includes binary coded decimal to code seven converters and electronic seven bar numeric output indicating means for conversion of the binary coded decimal count to suitable form for displaying the output solution as a legible set of decimal numeral characters.

13. An electronic digital slide rule according to claim 12 further including decimal point indicating means operatively coupled to and controlled by the first factor input means and second factor input means for indicating the placement of the decimal point in the output solution displayed by said output indicating means.

14. In an electronic computing device of the class having a rate multiplier and a first counter for producing a pulse rate signal proportional both to a clock rate and to a parallel digital input signal representing a first quantity and having a second counter responsive to said pulse rate signal and to a signal representing a second quantity for producing a digital count representative of the product or quotient of said two quantities, the combination of at least one additional counter and switching means for selectively connecting said multiplier and first counter to perform any of a plurality of arithmetic computational operations including transcendental functions.

15. The computing device of claim 14 wherein one said additional counter provides said parallel digital input signal representing a first quantity to said rate multiplier as a function of time.

16. In an electronic computing device of the class having a first rate multiplier and a first counter for producing a pulse rate signal proportional both to a clock rate and to a parallel digital input signal representing a first quantity and having a second counter responsive to said pulse rate signal and to a signal representing a second quantity for producing a digital count representative of the product or quotient of said two quantities, the combination of at least one additional rate multiplier, at least one additional counter and switching means for selectively connecting said rate multipliers and said additional counter to perform any of a plurality of arithmetic computational operations including transcendental functions.

17. The computing device of claim 16 wherein one said additional counter provides said parallel digital input signal representing a first quantity to said first rate multiplier as a function of time.

18. The computing device of claim 17 wherein there is one said additional rate multiplier and a second additional counter associated with said additional rate multiplier whereby a second parallel digital input signal representing a third quantity can be supplied as a function of time.

* * * * *